United States Patent
Goodarzi et al.

(10) Patent No.: US 12,427,969 B2
(45) Date of Patent: Sep. 30, 2025

(54) SYSTEMS AND METHODS FOR WARNING A DRIVER OF AN INCORRECT TRAILER BRAKE GAIN

(71) Applicant: GM GLOBAL TECHNOLOGY OPERATIONS LLC, Detroit, MI (US)

(72) Inventors: Avesta Goodarzi, Whitby (CA); Gursimran Chauhan, Courtice (CA); Todd Joseph Brinkman, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 155 days.

(21) Appl. No.: 18/519,371

(22) Filed: Nov. 27, 2023

(65) Prior Publication Data
US 2025/0171006 A1   May 29, 2025

(51) Int. Cl.
*B60T 17/22*   (2006.01)
*B60T 8/17*   (2006.01)

(52) U.S. Cl.
CPC .......... *B60T 17/221* (2013.01); *B60T 8/1708* (2013.01); *B60T 2270/406* (2013.01)

(58) Field of Classification Search
CPC . B60T 17/221; B60T 8/1708; B60T 2270/406
See application file for complete search history.

(56) References Cited

U.S. PATENT DOCUMENTS

| | | | |
|---|---|---|---|
| 12,145,414 B2* | 11/2024 | Lindenthal | B60G 17/019 |
| 2017/0287320 A1* | 10/2017 | Meade | G08C 17/02 |
| 2019/0217831 A1* | 7/2019 | Viele | B60D 1/245 |
| 2021/0309194 A1* | 10/2021 | Thomas | B60D 1/26 |
| 2022/0402468 A1* | 12/2022 | Kulkarni | B60T 8/1708 |
| 2024/0190198 A1* | 6/2024 | Lindenthal | B60G 17/019 |
| 2024/0270213 A1* | 8/2024 | Goodarzi | B60T 8/171 |

FOREIGN PATENT DOCUMENTS

| | | |
|---|---|---|
| DE | 19724092 A1 | 12/1998 |
| DE | 102019114610 A1 | 12/2019 |

OTHER PUBLICATIONS

German Office Action from counterpart DE102024102035, dated Mar. 18, 2025.

* cited by examiner

*Primary Examiner* — Sizo B Vilakazi

(57) ABSTRACT

A vehicle system includes one or more sensors and a control module. The control module is configured to receive one or more vehicle parameters, calculate an actual braking utilization factor based on the received vehicle parameters and an estimated vehicle parameter, calculate an optimum braking utilization factor based on the estimated vehicle parameter and an estimated trailer parameter, compare the optimum braking utilization factor and the actual braking utilization factor, and in response to a difference between the optimum braking utilization factor and the actual braking utilization factor being greater than a defined threshold, generate an alert signal to notify the driver of the vehicle that the trailer brake gain for the trailer hitched to the vehicle should be adjusted. Other example vehicle systems and methods for notifying a driver that a trailer brake gain should be adjusted are also disclosed.

20 Claims, 6 Drawing Sheets

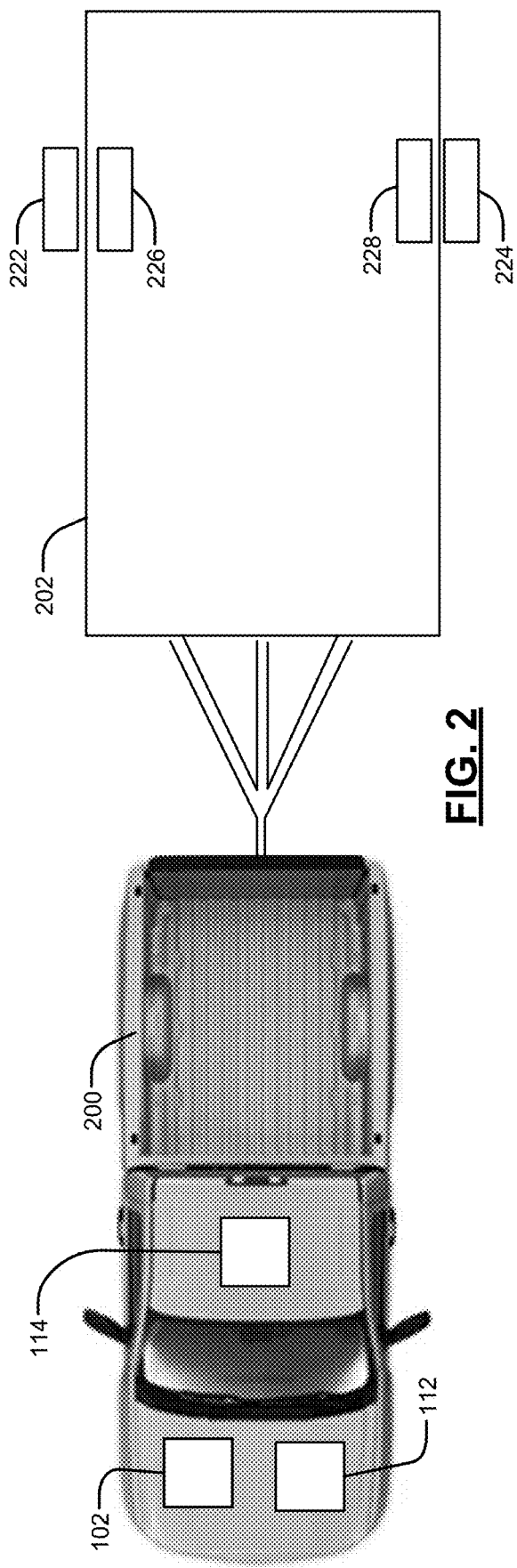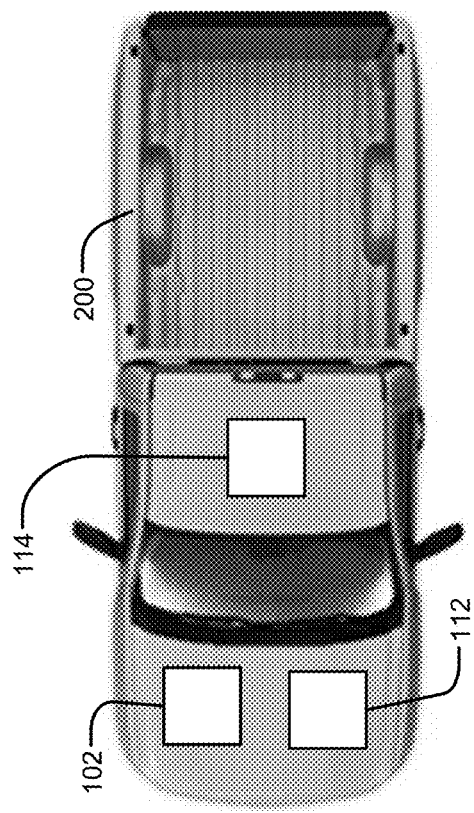

SYSTEMS AND METHODS FOR WARNING A DRIVER OF AN INCORRECT TRAILER BRAKE GAIN

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to systems and methods for warning a driver of an incorrect trailer brake gain.

A vehicle such as an electric vehicle or an internal combustion engine vehicle is sometimes attached to a trailer having brakes. In such scenarios, a trailer brake gain may be used to control the sensitivity of the trailer brakes when a driver actuates the vehicle brakes. The trailer brake gain may be set by a driver according to the weight and load of the vehicle and the trailer. In such examples, the trailer brake gain may be adjusted by the driver as desired. In other scenarios, the trailer brake gain may be determined through automatic trailer gain scaling by running an automatic gain scaling test or based on a fully automatic on-the-fly approach.

SUMMARY

A vehicle system for notifying a driver of a vehicle that a trailer brake gain of a trailer hitched to the vehicle should be adjusted is disclosed. The vehicle system includes one or more sensors configured to sense parameters of the vehicle, and a control module in communication with the one or more sensors. The control module is configured to estimate a vehicle parameter and a trailer parameter of the trailer hitched to the vehicle, receive one or more vehicle parameters from the one or more sensors, calculate an actual braking utilization factor for the vehicle based on the one or more received vehicle parameters and the estimated vehicle parameter, calculate an optimum braking utilization factor for the vehicle based on the estimated vehicle parameter and the estimated trailer parameter, compare the optimum braking utilization factor and the actual braking utilization factor, and in response to a difference between the optimum braking utilization factor and the actual braking utilization factor being greater than a defined threshold, generate an alert signal to notify the driver of the vehicle that the trailer brake gain for the trailer hitched to the vehicle should be adjusted.

In other features, the control module is configured to calculate a generated braking force based on the one or more received vehicle parameters when the vehicle is braking without the trailer hitched to the vehicle and when the vehicle is braking with the trailer hitched to the vehicle, calculate a consumed braking force based on the one or more received vehicle parameters and the estimated vehicle parameter when the vehicle is braking with the trailer hitched to the vehicle, and calculate the actual braking utilization factor for the vehicle by dividing the generated braking force by the consumed braking force.

In other features, the one or more received vehicle parameters include a brake pressure of the vehicle and a deceleration of the vehicle, and the estimated vehicle parameter includes an estimated vehicle mass.

In other features, the control module is configured to estimate a constant factor for the vehicle based on the estimated vehicle mass and a resistance force associated with the vehicle when the vehicle is braking without the trailer hitched to the vehicle, and calculate the generated braking force by multiplying the brake pressure when the vehicle is braking with the trailer hitched to the vehicle and the estimated constant factor when the vehicle is braking without the trailer hitched to the vehicle.

In other features, the control module is configured to calculate the consumed braking force by multiplying the estimated vehicle mass and the deceleration of the vehicle.

In other features, the control module is configured to receive a defined tongue weight ratio, and calculate the optimum braking utilization factor for the vehicle based on the defined tongue weight ratio, the estimated vehicle parameter, and the estimated trailer parameter.

In other features, the estimated vehicle parameter includes an estimated vehicle mass, and the estimated trailer parameter includes an estimated trailer mass.

In other features, the control module is configured to calculate the optimum braking utilization factor according to:

$$\frac{m_v + C_t m_t}{m_v}$$

where $M_v$ is the estimated vehicle mass, $M_t$ is the estimated trailer mass, and $C_t$ is the defined tongue weight ratio.

In other features, the control module is configured to determine whether the actual braking utilization factor is greater than the optimum braking utilization factor based on the comparison, and in response to determining the actual braking utilization factor is greater than the optimum braking utilization factor, generate the alert signal to notify the driver of the vehicle that the trailer brake gain for the trailer should be adjusted to a higher value.

In other features, the control module is configured to determine whether the actual braking utilization factor is less than the optimum braking utilization factor based on the comparison, and in response to determining the actual braking utilization factor is less than the optimum braking utilization factor, generate the alert signal to notify the driver of the vehicle that the trailer brake gain for the trailer should be adjusted to a lower value.

In other features, a vehicle includes the vehicle system and a warning device, wherein the control module of the vehicle system is configured to transmit the alert signal to the warning device for notifying the driver that the trailer brake gain for the trailer hitched to the vehicle should be adjusted.

In other features, the warning device is configured to instruct the driver to initiate an automated gain scaling test in response to the alert signal.

A method for notifying a driver of a vehicle that a trailer brake gain for a trailer hitched to the vehicle should be adjusted is disclosed. The method includes estimating a vehicle parameter and a trailer parameter of the trailer hitched to the vehicle, receiving one or more vehicle parameters from one or more sensors of the vehicle, calculating an actual braking utilization factor for the vehicle based on the one or more received vehicle parameters and the estimated vehicle parameter, calculating an optimum braking utilization factor for the vehicle based on the estimated vehicle parameter and the estimated trailer parameter, comparing the optimum braking utilization factor and the actual braking utilization factor, and in response to a difference between the optimum braking utilization factor and the actual braking utilization factor being greater than a defined threshold, generating an alert signal to notify a driver of the vehicle that a trailer brake gain for the trailer hitched to the vehicle should be adjusted.

In other features, the method further includes calculating a generated braking force based on the one or more received vehicle parameters when the vehicle is braking without the trailer hitched to the vehicle and when the vehicle is braking with the trailer hitched to the vehicle and calculating a consumed braking force based on the one or more received vehicle parameters and the estimated vehicle parameter when the vehicle is braking with the trailer hitched to the vehicle.

In other features, calculating the actual braking utilization factor for the vehicle includes dividing the generated braking force by the consumed braking force.

In other features, the one or more received vehicle parameters include a brake pressure of the vehicle and a deceleration of the vehicle, the estimated vehicle parameter includes an estimated vehicle mass, and the method further includes estimating a constant factor for the vehicle based on the estimated vehicle mass and a resistance force associated with the vehicle when the vehicle is braking without the trailer hitched to the vehicle.

In other features, calculating the generated braking force includes multiplying the brake pressure when the vehicle is braking with the trailer hitched to the vehicle and the estimated constant factor when the vehicle is braking without the trailer hitched to the vehicle.

In other features, calculating the consumed braking force includes multiplying the estimated vehicle mass and the deceleration of the vehicle.

In other features, the method further includes receiving a defined tongue weight ratio, the estimated vehicle parameter includes an estimated vehicle mass, and the estimated trailer parameter includes an estimated trailer mass.

In other features, calculating the optimum braking utilization factor for the vehicle includes calculating the optimum braking utilization factor according to:

$$\frac{m_v + C_t m_t}{m_v}$$

where $M_v$ is the estimated vehicle mass, $M_t$ is the estimated trailer mass, and $C_t$ is the defined tongue weight ratio.

In other features, the method further includes determining whether the actual braking utilization factor is greater than the optimum braking utilization factor based on the comparison.

In other features, generating the alert signal includes generating the alert signal to notify the driver of the vehicle that the trailer brake gain for the trailer should be adjusted to a higher value in response to determining the actual braking utilization factor is greater than the optimum braking utilization factor.

In other features, the method further includes determining whether the actual braking utilization factor is less than the optimum braking utilization factor based on the comparison.

In other features, generating the alert signal includes generating the alert signal to notify the driver of the vehicle that the trailer brake gain for the trailer should be adjusted to a lower value in response to determining the actual braking utilization factor is less than the optimum braking utilization factor.

In other features, the method further includes instructing the driver to initiate an automated gain scaling test in response to the alert signal.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 2 is a top view of a trailer hitched to a vehicle according to the present disclosure;

FIG. 3 is a top view of the vehicle of FIG. 2 without a trailer hitched thereto according to the present disclosure;

In the drawings, reference numbers may be reused to identify similar and/or identical elements.

DETAILED DESCRIPTION

A vehicle is often attached to a trailer having brakes. When trailering, a trailer brake gain may be set by a driver and/or determined (e.g., automatically) through a control process. The selection or determination of an optimum trailer brake gain is crucial for ensuring a shortest stopping distance, stable trailering, and a long service life for trailer tires. Additionally, the trailer brake gain often changes based on, for example, road and loading conditions. While conventional systems may be operable to determine a trailer brake gain, the trailer brake gain may be and/or become incorrect (e.g., not optimal). However, in such scenarios, the driver is not warned or otherwise aware of the incorrect trailer brake gain.

The vehicle systems and methods according to the present disclosure provide technical solutions for detecting an incorrect trailer brake gain, and then providing an alert to a driver of the incorrect trailer brake gain. In such examples, the vehicle systems and methods herein rely on available vehicle data to continuously monitor the correctness of existing trailer gain. Then, when a large deviation from optimum braking is identified, the vehicle systems and methods herein may automatically alert the driver to rescale the trailer brake gain manually and/or run an automatic trailer brake gain scaling test. As such, an optimum trailer brake gain may be determined and subsequently used by the vehicle. As a result, vehicle and trailer braking safety is improved through decreased stopping distances for the vehicle and improved trailer stabilization, while also increasing service life for the trailer tires.

Figure 1:
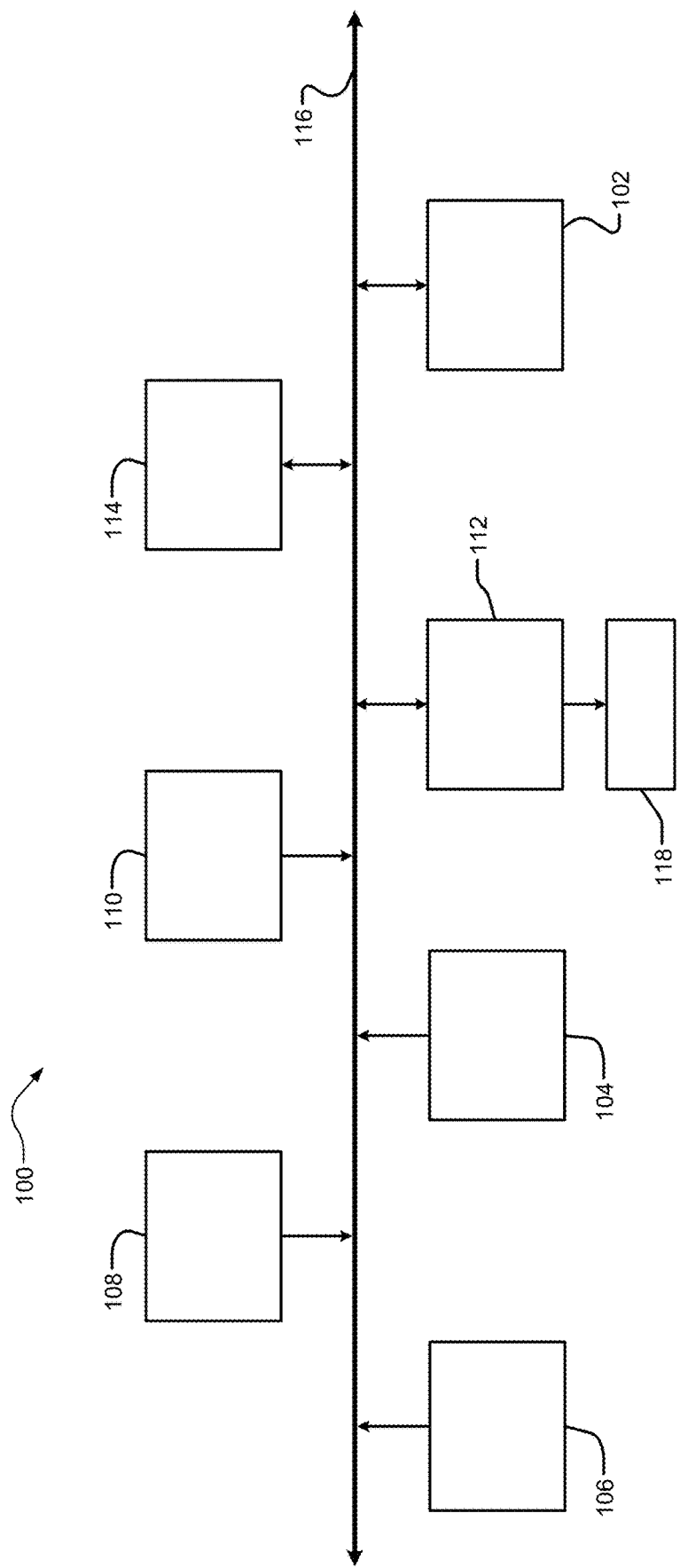
FIG. 1 is a functional block diagram of an example vehicle system for detecting an incorrect trailer brake gain for a trailer hitched to a vehicle and notifying a driver of the vehicle that the trailer brake gain should be adjusted, according to the present disclosure.

Referring now to FIG. 1, a block diagram of an example vehicle system 100 is presented for notifying a driver of a vehicle that a trailer brake gain of a trailer hitched to the vehicle should be adjusted. The vehicle system 100 of FIG. 1 may be employable in any suitable vehicle, such as an electric vehicle (e.g., a battery electric vehicle, a hybrid vehicle, a fuel cell vehicle, etc.) or an internal combustion engine vehicle. Additionally, the vehicle system 100 may be applicable to an autonomous vehicle, a semi-autonomous vehicle, or a non-autonomous vehicle. The trailer attached (e.g., hitched, etc.) to the vehicle may be any suitable type of trailer that has brakes controllable based on a trailer brake gain. In various embodiments, the trailer may be attached to the vehicle via a trailer hitch. For example, the trailer hitch may be attached to a frame of the vehicle (e.g., via bolts, etc.). The trailer hitch may be shaped, sized, etc. to accommodate the mounting of a trailer tongue having a ball, an opening, etc. The trailer includes a corresponding structure for attaching to the ball, the opening, etc.

The vehicle system 100 generally includes a vehicle control module 102 and various sensors in communication with the vehicle control module 102. As shown in FIG. 1, the sensors may include a velocity sensor 104, a torque sensor 106, a brake pressure sensor 108, and an acceleration sensor 110. As further explained below, the vehicle control module 102 generally detects an undesirable trailer brake gain for the trailer hitched to the vehicle based in part on vehicle parameters sensed by the sensors 104, 106, 108, 110, and then notifies the driver of the vehicle of the undesirable trailer brake gain.

As shown in FIG. 1, the vehicle system 100 further includes a trailer brake control module 112 and a warning module 114 in communication with the control module 102. In such examples, the warning module 114 may be any suitable device for generating a warning (e.g., a visual warning, an audible warning, etc.) for the driver, such as display module, a speaker, etc. Although FIG. 1 illustrates the vehicle system 100 as including specific modules and sensors, it should be appreciated that one or more other modules and/or sensors may be employed if desired. For example, more or less sensors and/or different sensors may be employed for sensing vehicle parameters to enable the control module 102 to perform the functions described herein. Additionally, while the vehicle system 100 is shown as including multiple separate modules (e.g., the vehicle control module 102, the trailer brake control module 112, the warning module 114, etc.), any combination of the modules and/or the functionality thereof may be integrated into one or more modules.

In the example of FIG. 1, the modules and sensors of the vehicle system 100 may share parameters via a network 116, such as a controller (or car) area network (CAN). In such examples, the parameters (e.g., vehicle parameters sensed by the sensors 104, 106, 108, 110) may be shared via one or more data buses of the network 116. As such, various parameters may be made available by a given module and/or sensor to other modules and/or sensors via the network 116.

In various embodiments, the trailer brake control module 112 controls actuation of trailer brake actuators 118 on the trailer hitched to the vehicle. Actuation of the trailer brake actuators 118 may apply mechanical (friction) brakes of the trailer. In other examples, the trailer may implement regenerative braking. In either case, control of the trailer brake actuators 118 is based on the trailer brake gain as determined by the vehicle control module 102. The trailer brake gain may be used to control the sensitivity of the trailer brakes when a driver actuates the vehicle brakes by adjusting the amount of power (e.g., current) applied to the trailer brake actuators 118 from a vehicle battery.

For example, FIG. 2 depicts a vehicle 200 and a trailer 202 hitched to the vehicle 200. As shown, the vehicle 200 (e.g., a truck) includes the vehicle control module 102, the trailer brake control module 112, and the warning module 114 of FIG. 1. The trailer 202 includes tires 222, 224 and brakes 226, 228 associated with the tires 222, 224. The trailer brake control module 112 controls the brakes 226, 228 based on a trailer brake gain that may be set by the driver (or another user in the vehicle 200) or determined by the vehicle control module 102 as explained herein. Although the vehicle 200 of FIG. 2 is shown as a truck, it should be appreciated that another suitable type of vehicle may be employed, such as a sports utility vehicle, a van, a car, etc. Additionally, while the vehicle 200 is shown as including the trailer brake control module 112, it should be appreciated that the trailer 202 may include the trailer brake control module 112 if desired.

With continued reference to FIG. 1, the control module 102 may estimate one or more vehicle parameters and trailer parameters of the trailer hitched to the vehicle. In such examples, the control module 102 may employ the estimated vehicle and/or trailer parameters along with the sensed vehicle parameters to detect an undesirable trailer brake gain.

For example, the control module 102 may estimate a mass of the vehicle. In such examples, the control module 102 may calculate an estimated vehicle mass using conventional methods when the vehicle is not towing a trailer. For example, FIG. 3 depicts the vehicle 200 of FIG. 2 without a trailer connected thereto. In such examples, the mass of the vehicle 200 of FIG. 3 can be estimated based on one or more sensed vehicle parameters, such as axle torque data sensed by the torque sensor 106, acceleration data (e.g., a longitudinal acceleration/deceleration) sensed by the acceleration sensor 110, speed data (e.g., wheel speed) sensed by the velocity sensor 104, etc. In other examples, the estimated vehicle mass may be previously stored in a memory circuit (of and/or in communication with the control module 102) and then accessed by the control module 102 when desired.

Additionally, the control module 102 may estimate a mass of the trailer hitched to the vehicle, such as the trailer 202 of FIG. 2. In various embodiments, the control module 102 estimates the trailer mass based on the vehicle mass. For example, the control module 102 may initially calculate the estimated vehicle mass without the trailer hitched to the vehicle and then store this value in a memory circuit. Then, after the trailer is hitched to the vehicle, the control module 102 may calculate the estimated vehicle mass again taking into account the trailer (and any load carried by the trailer). The control module 102 may then obtain the estimated trailer mass by taking the difference of the two calculated mass values.

In various embodiments, the control module 102 may estimate the vehicle mass and the trailer mass periodically, continuously, etc. For example, the control module 102 may dynamically obtain (and store) the vehicle mass every few seconds, every minute, every ten minutes, etc. when the vehicle is not towing a trailer. Likewise, the control module 102 may dynamically obtain the trailer mass every few seconds, every minute, every ten minutes, etc. when the vehicle is towing a trailer. In other examples, the control module 102 may continuously obtain the vehicle and/or the trailer mass, such as, for example, every ten milliseconds, etc.

Then, the control module 102 calculates an actual braking utilization factor for the vehicle which provides an indication of the amount of braking force generated and consumed by the vehicle. In various embodiments, the control module 102 may calculate the actual braking utilization factor based on one or more received vehicle parameters and the estimated vehicle parameter.

For example, the control module 102 calculates a generated braking force based on the received vehicle parameter(s) when the vehicle is braking without the trailer hitched to the vehicle and when the vehicle is braking with the trailer hitched to the vehicle. In such examples, the generated braking force may be calculated by multiplying a vehicle brake pressure ($P_b$) provided by the brake pressure sensor 108 when the trailer is connected and a vehicle brake force-pressure constant (K) estimated when the trailer is not connected, as shown in equation (1) below. The control module 102 may estimate the vehicle brake force-pressure constant (K) in any suitable manner, as further explained below.

Additionally, the control module 102 calculates a consumed braking force based on the received vehicle parameter(s) and the estimated vehicle parameter when the vehicle is braking with the trailer hitched to the vehicle. For example, the consumed braking force may be calculated based on the estimated vehicle mass value and a vehicle deceleration value provided by the acceleration sensor 110 when the trailer is connected. For instance, and with reference to equation (1) below, the control module 102 may multiple the estimated vehicle mass ($m_v$) and the vehicle longitudinal deceleration ($a_x$) to obtain the consumed braking force.

Then, the control module 102 can calculate the actual braking utilization factor by dividing the generated braking force by the consumed braking force, as shown in equation (1) below. In equation (1), the actual braking utilization factor is represented by $U_v$, the vehicle brake force-pressure constant is represented by K, the vehicle brake pressure is represented by $P_b$ (when the trailer is connected), the estimated vehicle mass is represented by $m_v$, and the vehicle longitudinal deceleration is represented by $a_x$ (when the trailer is connected). In various embodiments, the actual braking utilization factor ($U_v$) may be an absolute value of the generated braking force divided by consumed braking force, as shown.

$$U_v = \frac{\text{Generated Braking Force by Vehicle}}{\text{Consumed Braking Force by Vehicle}} = \left|\frac{KP_B}{m_v a_x}\right| \quad \text{Equation (1)}$$

In various embodiments, the vehicle brake force-pressure constant (K) is a constant factor estimated by the control module 102 when the vehicle is not towing a trailer. In some examples, the vehicle brake force-pressure constant (K) may be estimated based on a brake force of the vehicle and a resistance force associated with the vehicle. In such examples, the brake force of the vehicle is equal to the generated braking force (e.g., the vehicle brake pressure ($P_b$)*the vehicle brake force-pressure constant (K)). Additionally, the resistance force may be determined using conventional methods. For example, the resistance force may be determined using a quadradic function representing an aerodynamic resistance (e.g., an air resistance or air drag) associated with the vehicle, a rolling resistance associated with the vehicle, and a gradient resistance associated with the vehicle.

As one example, the vehicle brake force-pressure constant (K) may be estimated according to equation (2) below. In equation (2), $F_{BV}$ represents the brake force, $F_{RV}$ represents the resistance force, $W_v$ represents the unknown vehicle weight, $a_x$ represents the known vehicle longitudinal deceleration (when no trailer is connected), and g represents gravity. As shown, the brake force $F_{BV}$ is equal to the known vehicle brake pressure ($P_b$) (when no trailer is connected) multiplied by the vehicle brake force-pressure constant (K), and the resistance force $F_{RV}$ is represented by a quadradic function ($b_1*V^2+b_2*V+b_3$). In equation (2), the term $b_1*V^2$ represents the aerodynamic resistance, and the terms $b_2*V$ and $b_3$ represent the summation of the gradient and rolling resistances. In such examples, V represents the velocity of the vehicle (e.g., obtained from the velocity sensor 104), and $b_1$, $b_2$, $b_3$ represent unknown constants.

The control module 102 may then implement an estimator to estimate the unknown values for the vehicle brake force-pressure constant (K), the vehicle weight $W_v$, and the constants $b_1$, $b_2$, $b_3$. For example, conventional estimation techniques, such as Least Squares or another suitable technique, may be implemented. In such examples, the control module 102 may estimate the unknown values by collecting known values (e.g., $a_x$, V, and $P_b$) based on equation (2) below, and then implementing a conventional estimation technique.

$$W_v \frac{a_x}{g} = -F_{BV} - F_{RV} = -KP_B - b_1V^2 - b_2V - b_3 \quad \text{Equation (2)}$$

With continued reference to FIG. 1, the control module 102 calculates an optimum braking utilization factor for the vehicle. In such examples, the optimum braking utilization factor is an indication of an optimal amount braking utilization for the vehicle when the specific trailer is hitched thereto. In various embodiments, the control module 102 may calculate the optimum braking utilization factor based on the estimated vehicle mass and trailer mass.

In some examples, the optimum braking utilization factor may be determined based on other factors, such as a tongue weight ratio. For example, the control module 102 may receive or otherwise access a tongue weight ratio from a memory circuit (of and/or in communication with the control module 102). In such examples, the tongue weight ratio may be a defined or set nominal value that represents the portion of the trailer weight that is transferred to the vehicle through the hitch point. In various embodiments, the tongue weight ratio may be set to any suitable rational number less than one, such as 0.1, 0.13, 0.15, 0.17, 0.2, etc. Then, the control module 102 may calculate the optimum braking utilization factor based on the estimated vehicle mass and trailer mass and the tongue weight ratio.

As one example, the optimum braking utilization factor may be calculated according to equation (3) below. In equation (3), the optimum braking utilization factor is represented by $U_{v\text{-}Opt}$, the estimated vehicle mass is represented by $m_v$, the estimated trailer mass is represented by $m_t$, and the tongue weight ratio is represented by $C_t$. In this example, the optimum braking utilization factor ($U_{v\text{-}Opt}$) is the ratio between the effective mass of the vehicle during trailering (e.g., the vehicle mass $m_v$+the portion of the trailer mass $m_t$ transmitted to the vehicle through the hitch point ($C_t*m_t$)) and the vehicle mass ($m_v$). As such, if the trailer is heavier, the vehicle needs to contribute more in braking as compared to non-trailering situations.

$$U_{v\text{-}Opt} = \frac{m_v + C_t m_t}{m_v} \qquad \text{Equation (3)}$$

Next, the control module 102 may compare the optimum braking utilization factor and the actual braking utilization factor to determine whether the trailer brake gain employed for the trailer hitched to the vehicle is incorrect. For example, the control module 102 may determine the difference between the optimum braking utilization factor ($U_{v\text{-}Opt}$) and the actual braking utilization factor ($U_v$), and then compare that difference to one or more defined threshold values. For instance, if the optimum braking utilization factor ($U_{v\text{-}Opt}$) and the actual braking utilization factor ($U_v$) are similar (e.g., the difference is minimal), then the control module 102 may determine that the trailer brake gain employed for the trailer hitched to the vehicle is satisfactory and no action is required. However, if the difference between the optimum braking utilization factor ($U_{v\text{-}Opt}$) and the actual braking utilization factor ($U_v$) is more substantial (e.g., greater than a defined threshold value), then the control module 102 may determine that the trailer brake gain employed for the trailer hitched to the vehicle is not optimal and action should be taken.

For example, the control module 102 may generate an alert signal to notify the driver of the vehicle that the trailer brake gain for the trailer hitched to the vehicle should be adjusted based on the braking utilization factors comparison. For example, the control module 102 may generate the alert signal in response to the difference between the optimum braking utilization factor ($U_{v\text{-}Opt}$) and the actual braking utilization factor ($U_v$) being greater than the defined threshold. In such examples, the control module 102 may transmit the alert signal to the warning module 114 to generally notify the driver of the incorrect trailer brake gain. For example, the warning module 114 may be a display device in the vehicle that provides a visual warning (e.g., highlighted text, flashing lights, etc.), a speaker in the vehicle that provides an audible warning, etc. to instruct the driver to change the trailer brake gain. For example, the driver may be instructed to rescale the trailer brake gain manually and/or run an automated gain scaling test.

In some examples, the control module 102 may notify the driver of the vehicle that the trailer brake gain should be adjusted to a higher or lower value. For example, if the control module 102 determines that the actual braking utilization factor ($U_v$) is greater than the optimum braking utilization factor ($U_{v\text{-}Opt}$) based on the comparison between the two, the control module 102 may generate the alert signal to notify the driver that the trailer brake gain for the trailer should be adjusted to a higher value. In other words, the control module 102 alerts the driver of a low trailer brake gain. If, however, the control module 102 determines that the actual braking utilization factor ($U_v$) is less than the optimum braking utilization factor ($U_{v\text{-}Opt}$) based on the comparison, the control module 102 may generate the alert signal to notify the driver that the trailer brake gain for the trailer should be adjusted to a lower value (e.g., the control module 102 alerts the driver of a high trailer brake gain).

Figures 4, 5:
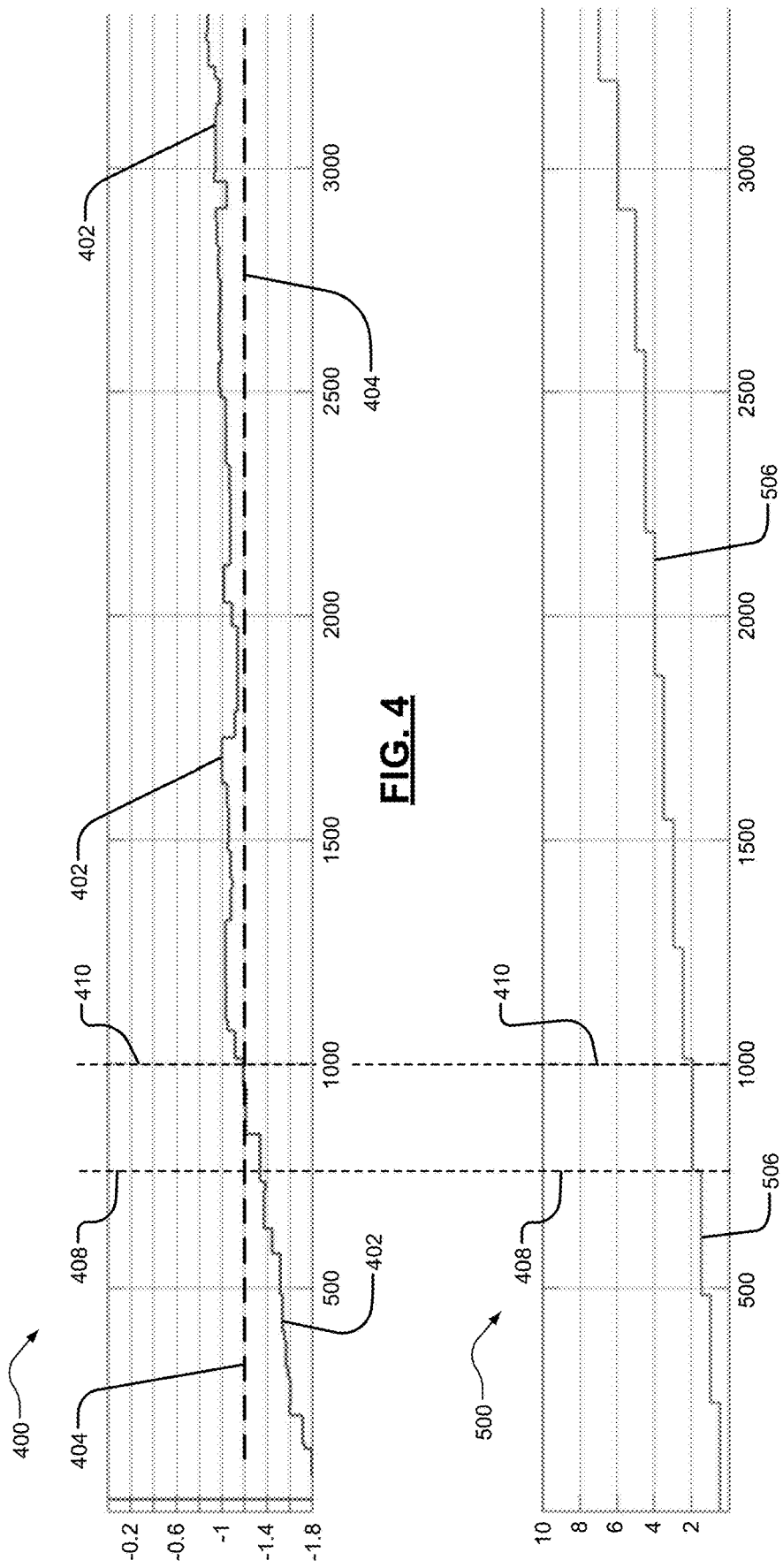
FIG. 4 is a graph showing a vehicle braking utilization factor over time according to the present disclosure.
FIG. 5 is a graph showing a trailer brake gain over time according to the present disclosure.

FIG. 4 depicts a graph 400 showing a vehicle braking utilization factor over time (seconds), and FIG. 5 depicts a graph 500 showing a trailer brake gain over time (seconds). As shown in FIG. 4, the solid line 402 represents the vehicle braking utilization factor ($U_v$) as calculated by the control module 102, and the dashed horizontal line 404 represents the optimum braking utilization factor ($U_{v\text{-}Opt}$) as calculated by the control module 102. In the graph 500 of FIG. 5, the line 506 represents a trailer brake gain set by a driver or determined by the control module 102, as explained herein. As shown, the vehicle braking utilization factor ($U_v$) changes over time as the trailer brake gain changes, thereby causing the vehicle braking utilization factor ($U_v$) to fall below and above the optimum braking utilization factor ($U_{v\text{-}Opt}$). In the example of FIGS. 4-5, the optimum trailer brake gain is shown to be at about 2 (e.g., where the braking utilization factor ($U_v$) and the optimum braking utilization factor ($U_{v\text{-}Opt}$) are similar), as indicated by the dashed vertical lines 408, 410.

Figure 6:
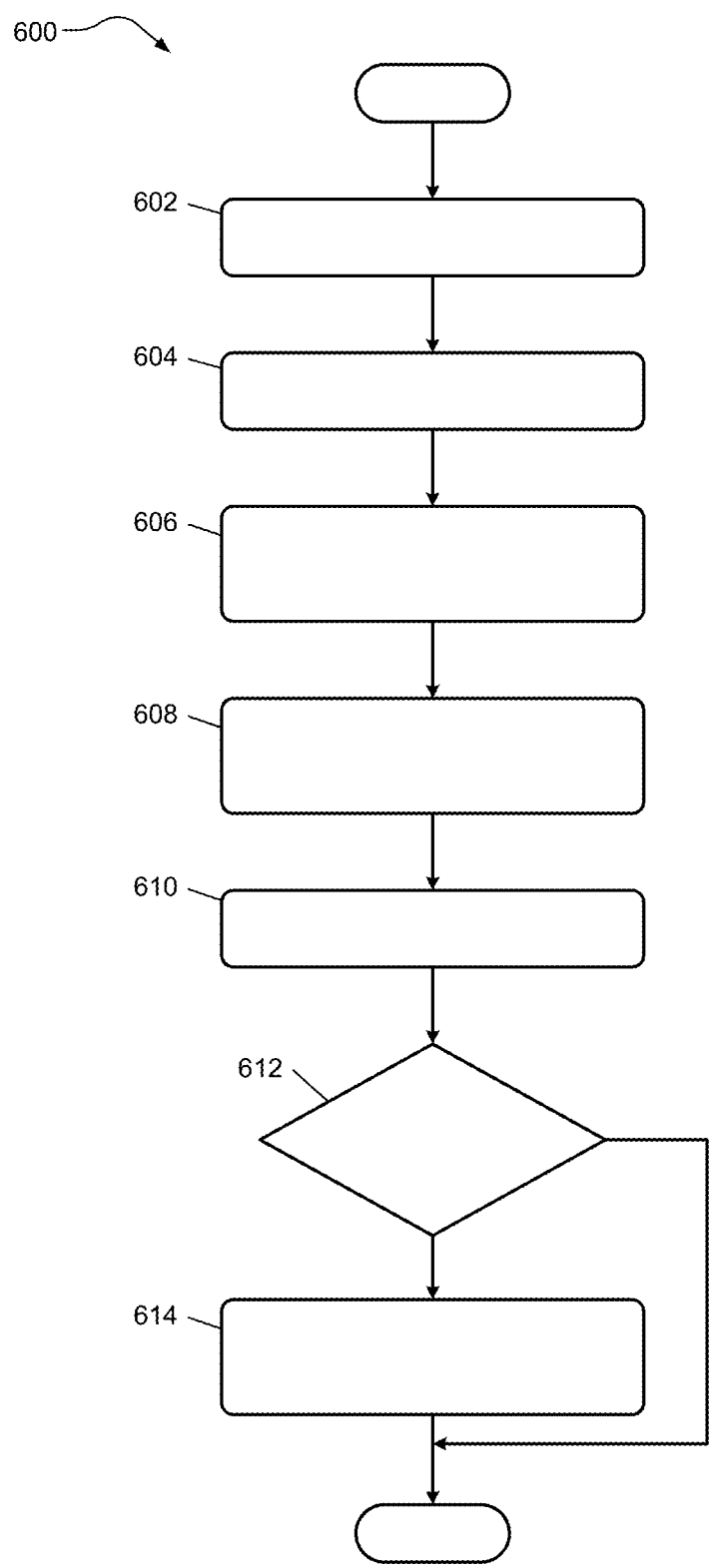
FIGS. 6-8 are flowcharts of example control processes for detecting an incorrect trailer brake gain for a trailer hitched to a vehicle and notifying a driver of the vehicle that the trailer brake gain should be adjusted, according to the present disclosure.
Figure 7:
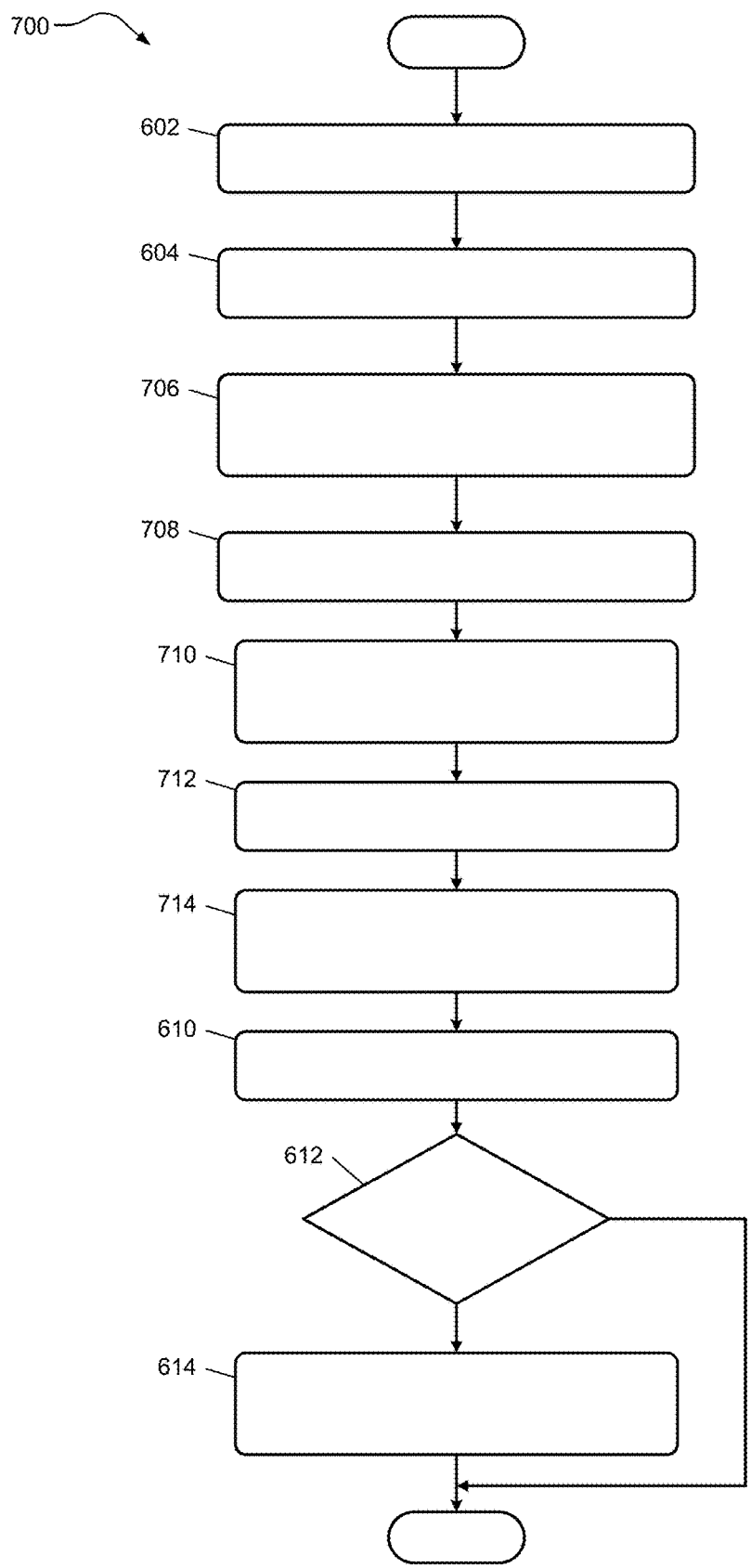
Figure 8:
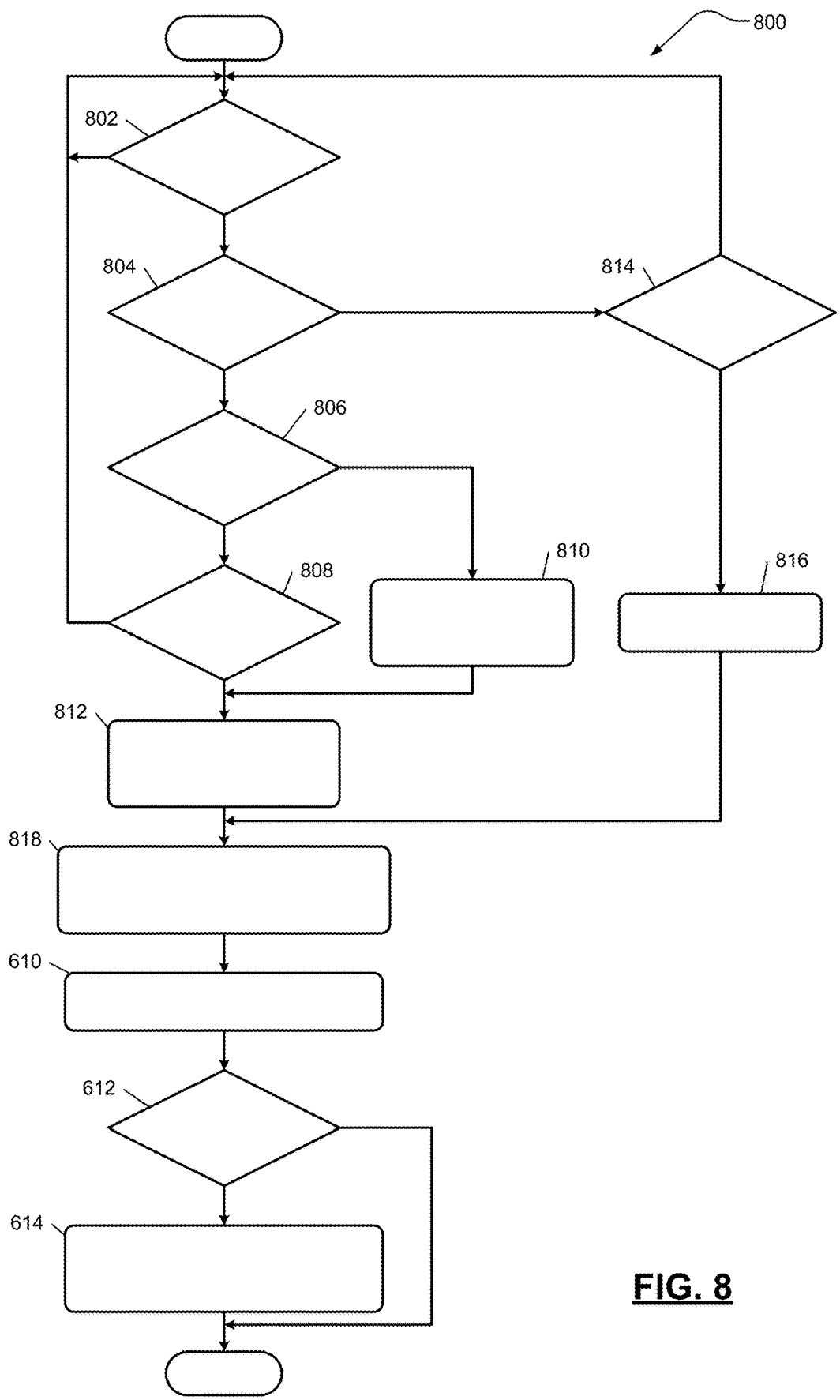

FIGS. 6-8 illustrate example control processes 600, 700, 800 employable by the vehicle system 100 of FIG. 1 for detecting an incorrect or less than optimal trailer brake gain for a trailer hitched to a vehicle (e.g., the trailer 202 and the vehicle 200 of FIG. 2), and then notifying a driver of the vehicle that the trailer brake gain should be adjusted. Although the example control processes 600, 700, 800 are described in relation to the vehicle system 100 of FIG. 1 including the vehicle control module 102, any one of the control processes 600, 700, 800 may be employable by any suitable system.

As shown in FIG. 6, the control process 600 begins at 602 where the control module 102 estimates vehicle and trailer parameters, such as a vehicle mass and a trailer mass. For example, and as explained above, the control module 102 may calculate an estimated vehicle mass using conventional methods when the vehicle is not towing a trailer, and an estimated trailer mass based on a mass calculated with the trailer connected and the previously calculated vehicle mass (with the trailer not connected). Control then proceeds to 604.

At 604, the control module 102 receives sensed vehicle parameters from one or more sensors in the vehicle. For example, the control module 102 may receive a vehicle brake pressure value from the brake pressure sensor 108 of FIG. 1, an axle torque value from the torque sensor 106 of FIG. 1, a velocity value from the velocity sensor 104 of FIG. 1, and a deceleration value from the acceleration sensor 110, as explained herein. In various embodiments, the control module 102 may receive some sensed vehicle parameters (e.g., the vehicle brake pressure, the deceleration value, the velocity, the torque, etc.) when the vehicle is not towing a trailer, and some sensed vehicle parameters (e.g., the vehicle brake pressure, the deceleration value, etc.) when the vehicle is towing a trailer. Control then proceeds to 606, 608.

At 606, the control module 102 calculates the vehicle braking utilization factor ($U_v$). In such examples, the vehicle braking utilization factor ($U_v$) is calculated based on the estimated vehicle parameter (e.g., the vehicle mass) and one or more of the sensed vehicle parameters (e.g., the vehicle brake pressure, the deceleration value, etc.). In some examples, the vehicle braking utilization factor ($U_v$) may be calculated according to equation (1) above.

At 608, the control module 102 calculates the optimum braking utilization factor ($U_{v\text{-}Opt}$) based on, for example, the estimates vehicle and trailer parameters (e.g., the vehicle mass and the trailer mass). For example, and as explained, the optimum braking utilization factor ($U_{v\text{-}Opt}$) may be calculated according to equation (3) above. Control then proceeds to 610, 612.

At 610, the control module 102 compares the calculated vehicle braking utilization factor ($U_v$) and optimum braking utilization factor ($U_{v\text{-}Opt}$). Then, at 612, the control module 102 determines whether the difference between the vehicle braking utilization factor ($U_v$) and the optimum braking utilization factor ($U_{v\text{-}Opt}$) is greater than a defined threshold, as explained above. If yes, the control module 102 generates (and transmits to, for example, the warning module 114) an alert signal to notify the driver of the vehicle that the trailer brake gain for the trailer hitched to the vehicle should be adjusted. In such examples, the generated an alert signal may also notify the driver that the trailer brake gain should be adjusted to a higher or lower value, and/or instruct the driver to rescale the trailer brake gain manually and/or run an automated gain scaling test, as explained herein. Control may then end as shown in FIG. 6 or return to another suitable step (e.g., step 602, step 604, etc.). If, however, the control module 102 determines at 612 that the difference is less than or equal to the defined threshold, control may end as shown in FIG. 6 (e.g., takes no action) or return to another suitable step (e.g., step 602, step 604, etc.).

The control process 700 of FIG. 7 is similar to the control process 600 of FIG. 6, but with additional and/or alternative control features. For example, the control process 700 of FIG. 7 includes the steps 602, 604 as explained above relative the control process 600 of FIG. 6. Then, control proceeds 706.

At 706, the control module 102 calculates a generated braking force for the vehicle based on one or more sensed vehicle parameters received at 604. In such examples, the sensed vehicle parameters may represent vehicle conditions when the vehicle is braking without the trailer hitched to the vehicle and when the vehicle is braking with the trailer hitched to the vehicle. For example, and as explained above, the generated braking force may be calculated by multiplying a vehicle brake pressure provided by the brake pressure sensor 108 when the trailer is connected, and a vehicle brake force-pressure constant estimated based on vehicle parameters when the trailer is not connected. Control then proceeds 708.

At 708, the control module 102 calculates a consumed braking force for the vehicle based on estimated and sensed vehicle parameters. For example, the consumed braking force may be calculated by multiplying an estimated vehicle mass without the trailer hitched (obtained at 602) and a deceleration value provided by the acceleration sensor 110 with the trailer hitched (obtained at 604), as explained above. Control then proceeds 710, where the control module 102 calculates a vehicle braking utilization factor ($U_v$) based on the generated and consumed braking forces. For instance, and as explained above, the control module 102 may calculate the braking utilization factor ($U_v$) by dividing the generated braking force by the consumed braking force, as shown in equation (1) above. Control then proceeds 712.

At 712, the control module 102 access or otherwise receives a defined tongue weight ratio. In some examples, the tongue weight ratio may be set as a nominal value between 0.1 and 0.2 (e.g., 0.15, etc.), as explained above. Control then proceeds 714, where the control module 102 calculates an optimum braking utilization factor ($U_{v\text{-}Opt}$) based on the tongue weight ratio and the estimated parameters (e.g., the vehicle mass and the trailer mass). For instance, and as explained above, the optimum braking utilization factor ($U_{v\text{-}Opt}$) may be calculated according to equation (3) above. Control then proceeds 610, 612, 614 explained above relative the control process 600 of FIG. 6.

As shown in FIG. 8, the control process 800 begins at 802 where the control module 102 determines whether the vehicle is being driven along a straight-line and on a flat surface. In doing so, the control module 102 ensures the driving conditions are relatively standard, as curves, inclined and/or declined surfaces may add load to the vehicle (and trailer) axels and effect braking capacity. In various embodiments, the control module 102 may detect such surface (e.g., road) conditions based on one or more sensors (e.g., radar sensors, lidar sensors, ultrasonic sensors, etc.) and/or cameras mounted on the exterior and/or interior of the vehicle. If the control module 102 determines that the vehicle is not being driven along a straight-line and on a flat surface, control returns to 802. Otherwise, if the control module 102 determines that the vehicle is being driven along a straight-line and on a flat surface, control proceeds to 804.

At 804, the control module 102 determines whether a trailer is hitched to (e.g., connected to) the vehicle. In various embodiments, the control module 102 may make this determination based the one or more sensors and/or cameras mounted on the exterior and/or interior of the vehicle, based on user input, etc. If no trailer is hitched to the vehicle, control proceeds to 806. If, however, a trailer is hitched to the vehicle, control proceeds to 814.

At 806, the control module 102 determines whether the vehicle is experiencing a braking event. In various embodiments, the control module 102 may rely on a deceleration value provided by the acceleration sensor 110, a vehicle brake pressure provided by the brake pressure sensor 108, etc. to make this determination. If the vehicle is experiencing a braking event, control proceeds to 808. Otherwise, if the vehicle is not experiencing a braking event, control proceeds to 810.

At 808, the control module 102 determines whether the braking event is a mild braking event. In various embodiments, the control module 102 may rely on a deceleration value provided by the acceleration sensor 110, a velocity provided by the velocity sensor 104, etc. to make this determination. In some examples, the control module 102 may determine that the vehicle is experiencing a mild braking event only if the deceleration is within a defined range and the velocity is within a defined range. For example, if the longitudinal deceleration $a_x$ (e.g., a negative value) is greater than a deceleration threshold $a_{max}$ and the velocity is between a minimum velocity threshold $V_{min}$ and a maximum velocity threshold $V_{max}$, the control module 102 may determine that the vehicle is experiencing a mild braking event. The deceleration threshold $a_{max}$ may be any suitable value, such as −0.1 g (or m/sec²), −0.15 g, −0.2 g, −0.25 g, etc. In such examples, the longitudinal deceleration $a_x$ would need to be larger (e.g., a lower negative number or closer to zero) to satisfy the deceleration inequality. Additionally, the minimum velocity threshold $V_{min}$ may be any suitable value, such as 3 m/sec, 4 m/sec, 5 m/sec, 6 m/sec, 7 m/sec, etc., and the maximum velocity threshold $V_{max}$ may be any suitable value, such as 13 m/sec, 14 m/sec, 15 m/sec, 16 m/sec, 17 m/sec, etc. If the braking event does not qualify as a mild braking event at 808, control returns to 802. If, however, the braking event does qualify as a mild braking event at 808, control proceeds to 812.

At 810, the control module 102 estimates a vehicle mass and resistance force for the vehicle. For example, the control module 102 may calculate an estimated vehicle mass using conventional methods when the vehicle is not towing a trailer and not braking. In such examples, the vehicle mass can be estimated based on one or more sensed vehicle parameters, such as an axle torque provided by the torque sensor 106, a longitudinal deceleration $a_x$ provided by the acceleration sensor 110, velocity provided by the velocity sensor 104, etc., as explained above. Additionally, the control module 102 may calculate an estimated resistance force for the vehicle using conventional methods, such as a quadradic function (e.g., in equation (2) above) representing an aerodynamic resistance, a rolling resistance, and a gradient resistance, as explained above. Control then proceeds to 812.

At 812, the control module 102 estimates a vehicle brake force-pressure constant (K) for the vehicle. As explained above, the control module 102 may rely on the estimated vehicle mass (of 810), the resistance force for the vehicle (of 810), a vehicle brake pressure provided by the brake pressure sensor 108, a longitudinal deceleration $a_x$ provided by the acceleration sensor 110, etc. and equation (2) above to determine the vehicle brake force-pressure constant (K). Control then proceeds to 818.

At 814, the control module 102 determines whether the braking event is a mild braking event if the trailer is hitched to the vehicle (as determined in 804). In various embodiments, the control module 102 may make this determination in a similar manner as explained above relative to 808. If the control module 102 determines that no mild braking event is taking place at 814, control returns to 802. If, however, a mild braking event is taking place at 814, control proceeds to 816.

At 816, the control module 102 estimates a trailer mass for the trailer hitched to the vehicle. In various embodiments, the control module 102 may estimate the trailer mass based on a mass calculated with the trailer connected and the previously calculated vehicle mass (with the trailer not connected), as explained above. Control then proceeds to 818.

At 818, the control module 102 calculates a braking utilization factor ($U_v$) and an optimum braking utilization factor ($U_{v\text{-}Opt}$). For example, and as explained above, the braking utilization factor ($U_v$) may be determined according to equation (1) above and based on the estimated vehicle brake force-pressure constant (K), a vehicle brake pressure provided by the brake pressure sensor 108 (when the trailer is connected), the estimated vehicle mass, and a longitudinal deceleration $a_x$ provided by the acceleration sensor 110 (when the trailer is connected). Additionally, the optimum braking utilization factor ($U_{v\text{-}Opt}$) may be determined according to equation (3) above and based on the estimated vehicle mass, the estimated trailer mass, and a set tongue weight ratio, as explained above. Control then proceeds 610, 612, 614 explained above relative the control process 600 of FIG. 6.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A vehicle system for notifying a driver of a vehicle that a trailer brake gain of a trailer hitched to the vehicle should be adjusted, the vehicle system comprising:
   one or more sensors configured to sense parameters of the vehicle; and
   a control module in communication with the one or more sensors, the control module configured to:
      estimate a vehicle parameter and a trailer parameter of the trailer hitched to the vehicle;
      receive one or more vehicle parameters from the one or more sensors;
      calculate an actual braking utilization factor for the vehicle based on the one or more received vehicle parameters and the estimated vehicle parameter;
      calculate an optimum braking utilization factor for the vehicle based on the estimated vehicle parameter and the estimated trailer parameter;
      compare the optimum braking utilization factor and the actual braking utilization factor; and
      in response to a difference between the optimum braking utilization factor and the actual braking utilization factor being greater than a defined threshold, generate an alert signal to notify the driver of the vehicle that the trailer brake gain for the trailer hitched to the vehicle should be adjusted.

2. The vehicle system of claim 1, wherein the control module is configured to:
   calculate a generated braking force based on the one or more received vehicle parameters when the vehicle is braking without the trailer hitched to the vehicle and when the vehicle is braking with the trailer hitched to the vehicle;
   calculate a consumed braking force based on the one or more received vehicle parameters and the estimated vehicle parameter when the vehicle is braking with the trailer hitched to the vehicle; and
   calculate the actual braking utilization factor for the vehicle by dividing the generated braking force by the consumed braking force.

3. The vehicle system of claim 2, wherein:
   the one or more received vehicle parameters include a brake pressure of the vehicle and a deceleration of the vehicle; and
   the estimated vehicle parameter includes an estimated vehicle mass.

4. The vehicle system of claim 3, wherein the control module is configured to:
   estimate a constant factor for the vehicle based on the estimated vehicle mass and a resistance force associated with the vehicle when the vehicle is braking without the trailer hitched to the vehicle; and
   calculate the generated braking force by multiplying the brake pressure when the vehicle is braking with the trailer hitched to the vehicle and the estimated constant factor when the vehicle is braking without the trailer hitched to the vehicle.

5. The vehicle system of claim 3, wherein the control module is configured to calculate the consumed braking force by multiplying the estimated vehicle mass and the deceleration of the vehicle.

6. The vehicle system of claim 1, wherein the control module is configured to:
   receive a defined tongue weight ratio; and
   calculate the optimum braking utilization factor for the vehicle based on the defined tongue weight ratio, the estimated vehicle parameter, and the estimated trailer parameter.

7. The vehicle system of claim 6, wherein:
   the estimated vehicle parameter includes an estimated vehicle mass; and
   the estimated trailer parameter includes an estimated trailer mass.

8. The vehicle system of claim 7, wherein the control module is configured to calculate the optimum braking utilization factor according to:

$$\frac{m_v + C_t m_t}{m_v}$$

where $M_v$ is the estimated vehicle mass, $M_t$ is the estimated trailer mass, and $C_t$ is the defined tongue weight ratio.

9. The vehicle system of claim 1, wherein the control module is configured to:
   determine whether the actual braking utilization factor is greater than the optimum braking utilization factor based on the comparison; and
   in response to determining the actual braking utilization factor is greater than the optimum braking utilization factor, generate the alert signal to notify the driver of the vehicle that the trailer brake gain for the trailer should be adjusted to a higher value.

10. The vehicle system of claim 1, wherein the control module is configured to:
    determine whether the actual braking utilization factor is less than the optimum braking utilization factor based on the comparison; and
    in response to determining the actual braking utilization factor is less than the optimum braking utilization factor, generate the alert signal to notify the driver of the vehicle that the trailer brake gain for the trailer should be adjusted to a lower value.

11. A vehicle comprising the vehicle system of claim 1 and a warning device, wherein the control module of the vehicle system is configured to transmit the alert signal to the warning device for notifying the driver that the trailer brake gain for the trailer hitched to the vehicle should be adjusted.

12. The vehicle of claim 11, wherein the warning device is configured to instruct the driver to initiate an automated gain scaling test in response to the alert signal.

13. A method for notifying a driver of a vehicle that a trailer brake gain for a trailer hitched to the vehicle should be adjusted, the method comprising:
    estimating a vehicle parameter and a trailer parameter of the trailer hitched to the vehicle;
    receiving one or more vehicle parameters from one or more sensors of the vehicle;
    calculating an actual braking utilization factor for the vehicle based on the one or more received vehicle parameters and the estimated vehicle parameter;
    calculating an optimum braking utilization factor for the vehicle based on the estimated vehicle parameter and the estimated trailer parameter;
    comparing the optimum braking utilization factor and the actual braking utilization factor; and
    in response to a difference between the optimum braking utilization factor and the actual braking utilization factor being greater than a defined threshold, generating an alert signal to notify a driver of the vehicle that a trailer brake gain for the trailer hitched to the vehicle should be adjusted.

14. The method of claim 13, wherein:
    the method further comprises calculating a generated braking force based on the one or more received vehicle parameters when the vehicle is braking without the trailer hitched to the vehicle and when the vehicle is braking with the trailer hitched to the vehicle and calculating a consumed braking force based on the one or more received vehicle parameters and the estimated vehicle parameter when the vehicle is braking with the trailer hitched to the vehicle; and
    calculating the actual braking utilization factor for the vehicle includes dividing the generated braking force by the consumed braking force.

15. The method of claim 14, wherein:
    the one or more received vehicle parameters include a brake pressure of the vehicle and a deceleration of the vehicle;
    the estimated vehicle parameter includes an estimated vehicle mass;
    the method further comprises estimating a constant factor for the vehicle based on the estimated vehicle mass and a resistance force associated with the vehicle when the vehicle is braking without the trailer hitched to the vehicle; and
    calculating the generated braking force includes multiplying the brake pressure when the vehicle is braking with the trailer hitched to the vehicle and the estimated constant factor when the vehicle is braking without the trailer hitched to the vehicle.

16. The method of claim 15, wherein calculating the consumed braking force includes multiplying the estimated vehicle mass and the deceleration of the vehicle.

17. The method of claim 13, wherein:
    the method further comprises receiving a defined tongue weight ratio;
    the estimated vehicle parameter includes an estimated vehicle mass;
    the estimated trailer parameter includes an estimated trailer mass; and
    calculating the optimum braking utilization factor for the vehicle includes calculating the optimum braking utilization factor according to:

$$\frac{m_v + C_t m_t}{m_v}$$

where $M_v$ is the estimated vehicle mass, $M_t$ is the estimated trailer mass, and $C_t$ is the defined tongue weight ratio.

18. The method of claim 13, wherein:
    the method further comprises determining whether the actual braking utilization factor is greater than the optimum braking utilization factor based on the comparison; and
    generating the alert signal includes generating the alert signal to notify the driver of the vehicle that the trailer brake gain for the trailer should be adjusted to a higher value in response to determining the actual braking utilization factor is greater than the optimum braking utilization factor.

19. The method of claim 13, wherein:
    the method further comprises determining whether the actual braking utilization factor is less than the optimum braking utilization factor based on the comparison; and
    generating the alert signal includes generating the alert signal to notify the driver of the vehicle that the trailer brake gain for the trailer should be adjusted to a lower value in response to determining the actual braking utilization factor is less than the optimum braking utilization factor.

20. The method of claim 13, further comprising instructing the driver to initiate an automated gain scaling test in response to the alert signal.

* * * * *